No. 780,044. PATENTED JAN. 17, 1905.
A. S. KROTZ.
RUBBER TIRE.
APPLICATION FILED APR. 13, 1904.
2 SHEETS—SHEET 2.
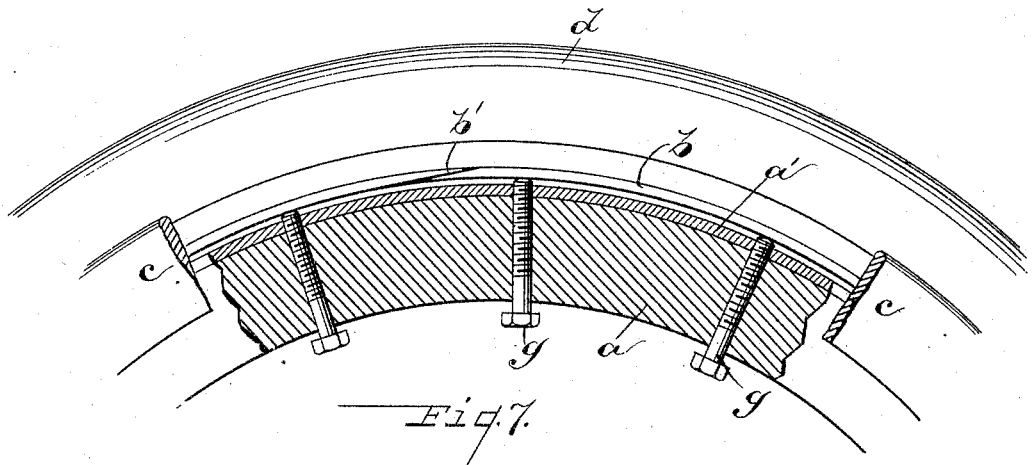
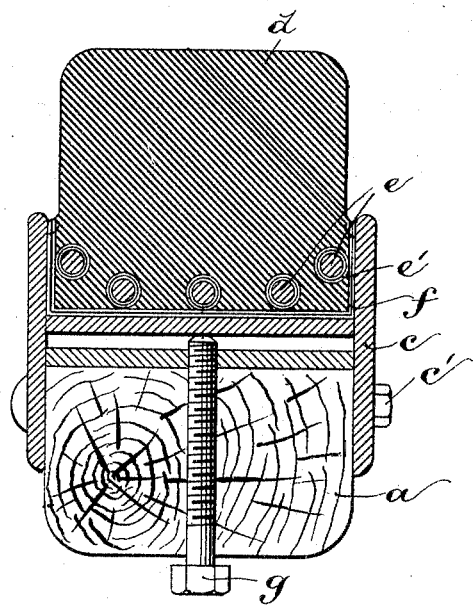
Witnesses
Inventor
Alvaro S. Krotz
By Staley & Bowman
Attorneys No. 780,044.

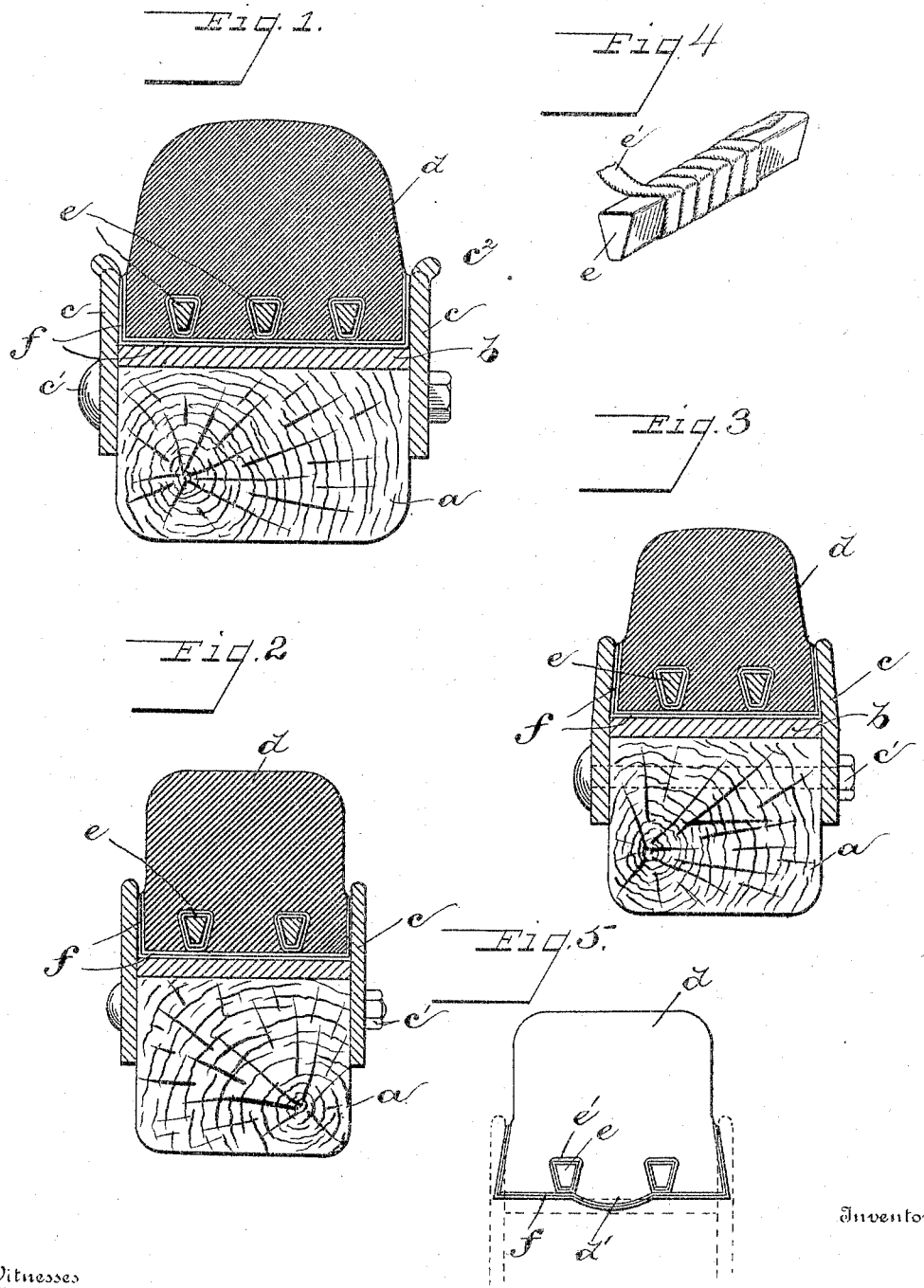

Patented January 17, 1905.

UNITED STATES PATENT OFFICE.

ALVARO S. KROTZ, OF SPRINGFIELD, OHIO, ASSIGNOR TO CONSOLIDATED RUBBER TIRE COMPANY, OF JERSEY CITY, NEW JERSEY, A CORPORATION OF NEW JERSEY.

RUBBER TIRE.

SPECIFICATION forming part of Letters Patent No. 780,044, dated January 17, 1905.

Application filed April 13, 1904. Serial No. 202,914.

*To all whom it may concern:*

Be it known that I, ALVARO S. KROTZ, a citizen of the United States, residing at Springfield, in the county of Clark and State of Ohio, have invented certain new and useful Improvements in Rubber Tires, of which the following is a specification.

My invention relates to improvements in rubber tires for vehicle-wheels; and the object of my invention is to provide improved means for securing the rubber tire on the rim of the wheel to which it is applied.

My invention consists in the constructions and combinations of parts hereinafter described, and set forth in the claims.

In the accompanying drawings, Figure 1 is a vertical sectional view through the wheel-rim, showing a tire embodying my invention. Figs. 2 and 3 are similar views of the same, showing slight modifications. Fig. 4 is a detail. Fig. 5 is an end view of the rubber tire before it is placed in the channel shown in dotted lines. Fig. 6 is a side elevation, partly in section, of a portion of a wheel-rim, showing auxiliary tightening devices for the rubber tire. Fig. 7 is a vertical sectional view of same and also showing a modified form of retaining-band.

Like parts are represented by similar letters of reference in the several views.

The rubber tire to which my invention relates is of that type which employs a series of endless retaining-bands running through the base of the rubber portion of the tire, these retaining-bands forming, in effect, dovetailed grooves between the respective bands and the sides of the channel to receive the rubber portion of the tire and retain the same in place.

In the said drawings, $a$ represents the wooden felly of a vehicle-wheel, and $b$ a metallic rim encircling the periphery of said wooden felly. Adapted to be secured to the sides of the wooden felly by bolts $c'$ or other suitable fastening devices are metallic rings $c$, which extend beyond the rim $b$ and form, with the same, a metallic channel around the periphery of the wheel. Those portions of the rings forming the sides of the channel may be of any suitable shape; but I prefer to make them substantially straight, though they may be slightly flared inwardly, as shown in Fig. 3, if desired. The outer peripheries of the flanges or rings may also be slightly flared outwardly, if desired, as shown at $c^2$ in Fig. 1. The rubber tire $d$ is formed of a shape at the base to fit the metallic channel thus formed, but is made slightly wider than the width of the metallic rim forming the base of the channel, for the purpose hereinafter explained. The upper or tread portion of the rubber tire may be given any suitable form, several being illustrated in the drawings, the base of the tire being given a gradual taper from the bottom to a point about opposite the tops of the channel-flanges. Extending through the base of the rubber portion $d$ of the tire is a series of metallic retaining strips or bands $e$, wrapped with layers of fabric $e'$, as shown. The metallic strips are preferably made of a V shape, as shown in Figs. 1, 2, and 3; but round bands like those illustrated in Fig. 7 may be employed, if desired. The retaining-bands are adapted to stand substantially flush with the bottom of the rubber portion $d$ of the tire, as shown, and a covering of fabric is placed on the base and along the sides of the rubber, as indicated at $f$, the fabric extending up the sides of the rubber to a point near the tops of the side flanges of the channel. The tire thus formed, consisting of the rubber, retaining-bands, and their fabric covering, and the fabric covering for the base and sides of the rubber are vulcanized together, the retaining-bands being first united, thus forming an endless tire of a substantially integral structure. The rubber tire thus formed is placed on the wheel before the side rings or flanges are bolted into position, the tire being sprung over the periphery of the wheel onto the metallic base $b$ of the channel, the said side rings being then bolted onto the wooden felly, as before described. The base of the tire being made slightly wider than the width of the channel, as before described, the side flanges of the channel when bolted into position will press the rubber more firmly into the dovetailed grooves formed by the retaining-bands. To further insure the rubber being pressed firmly into the dovetailed openings between the retaining-bands, the base of the rubber between the respective bands may be formed with an enlargement $d'$, as shown in Fig. 5. This construction when the rubber tire is forced onto the base of the channel will tend to crowd the rubber up into the dovetailed spaces between the retaining-bands, and thus provide a more secure anchoring of the rubber between said bands.

By the construction thus described of forming the rubber tire the retaining-bands rest on several layers of fabric, which encircle the bands and cover the base of the rubber. The construction firmly holds the rubber to the bands, and the rubber, bands, and seat are firmly held together by the comparatively hard substance or fabric between the bands and seat.

To insure rigidity of the structure and provide means for tightening the rubber tire in the channel at the time the parts are assembled or at any time the tire should become loose therein for any reason, so as to press the fabric covering on the base of the rubber tire firmly against the retaining-bands and their covering and bind said bands firmly in the tire, I construct the rim or base $b$ of the channel so as to be expansible, this construction being illustrated in Figs. 6 and 7. To accomplish this, I place the base $b$ loosely about the felly $a$, the respective ends of the base being beveled and overlapped, as shown at $b'$ in Fig. 6. Through the felly I extend a series of adjusting-screws $g$, adapted to bear against the expansible base and press the same outwardly, so as to increase the circumference of the base of the channel when the screws are turned. As shown in Figs. 6 and 7, the wooden felly may be reinforced at its outer periphery by a reinforcing-band $a'$, secured thereto in any suitable manner. Instead of the screws $g$ wedges may be employed to expand the base, the said wedges being inserted between the base and the reinforcing-band $a'$.

In Fig. 7 I have shown a construction in which two of the retaining-bands are extended through the rubber at points directly opposite the side flanges of the channel, said side retaining-bands and their wrappings standing flush with the respective sides of the base of the rubber, with the fabric which extends up the sides of the base of the rubber tending to bind said side bands firmly in their positions. I have shown three bands in the extreme bottom of the base of the rubber in Fig. 7; but it will be understood that a lesser number may be employed, depending on the size of the tire.

Having thus described my invention, I claim—

1. In a vehicle-wheel, a metallic channel having one or both of its sides removable, an endless rubber tire adapted to be seated therein, said rubber tire being wider than the base of said channel, retaining-bands extending through the base of said rubber tire but adapted to stand substantially flush with the bottom thereof, and a fabric cover for the base of said tire extending between said bands and the base of the channel adapted to bind said retaining-bands in position in said tire, substantially as specified.

2. In a vehicle-wheel, a metallic channel, a rubber tire seated therein, V-shaped retaining-bands extending through the base of said rubber tire with the narrowest portions of said bands substantially flush with the bottom of said tire, and a fabric covering for the base of said tire extending between said bands and the base of the channel adapted to bind said retaining-bands in position in said tire and take the strain thereof, substantially as specified.

3. In a vehicle-wheel, a metallic channel, a rubber tire seated therein, V-shaped retaining-bands extending through the base of said rubber tire, fabric coverings for said retaining bands, the narrowest portions of said retaining-bands and their fabric coverings being substantially flush with the bottom of said tire, and a fabric covering for the base of said tire extending between said bands and the base of the channel adapted to bind said bands and their coverings in position in said tire, substantially as and for the purpose specified.

4. In a vehicle-wheel, a metallic channel having one or more removable sides, an endless rubber tire seated therein, V-shaped retaining-bands extending through the base of said tire, fabric coverings for said retaining-bands, said bands and their coverings being substantially flush with the bottom of said tire and forming in effect dovetailed openings between the respective bands and the sides of the channel, and a fabric covering for the base of said tire extending between said bands and the base of the channel adapted to bind the bands and their coverings in position in said tire, substantially as specified.

5. In a vehicle-wheel, a metallic channel having one or more removable side flanges, a rubber tire seated therein, endless retaining-bands extending through the base of said tire forming in effect dovetailed openings between said bands and between the bands and the sides of the channel, said bands being substantially flush with the bottom of the rubber tire, said rubber tire being formed with enlargements on its base between the respective retaining-bands, for the purpose specified.

6. In a vehicle-wheel, a metallic channel, a rubber tire seated therein, retaining-bands extending through the base of said rubber tire and adapted to stand substantially flush with the bottom thereof, said retaining-bands being provided with independent fabric coverings, and a fabric covering for the base of said rubber tire extending between said retaining-bands and their coverings and the base of said channel and adapted to bind said retaining-bands and their fabric coverings in position in said tire, substantially as specified.

7. In a vehicle-wheel, a metallic channel having one or more removable side flanges, a rubber tire seated therein, endless retaining-bands extending through the base of said tire forming in effect dovetailed openings between said bands and the sides of the channels, said bands being substantially flush with the bottom of the rubber tire, enlargement of the base of said rubber tire between said bands, the base of said rubber tire being made slightly wider than the width of the channel, substantially as and for the purpose specified.

8. In a vehicle-wheel, a metallic channel, a rubber tire seated therein, retaining-bands extending through the base and sides of said rubber tire and adapted to stand substantially flush with the said base and sides of the tire, said retaining-bands being provided with fabric coverings, and a fabric covering for the base and sides of said rubber tire extending between said retaining-bands and their coverings and the base and sides of the channel adapted to bind said retaining-bands and their coverings in position in said tire, substantially as specified.

9. In a vehicle-wheel, a metallic channel, a rubber tire seated therein, retaining-bands extending through the base of said tire, independent fabric coverings for said bands, the bands and their fabric coverings being adapted to stand substantially flush with the bottom of said rubber tire, a fabric covering for the base of said rubber tire extending between said bands and the base of the channel adapted to bind said bands and their fabric coverings in position in said rubber tire, said channel being provided with an expansible base with means for expanding the same to press said base against the fabric on said tire, for the purpose specified.

10. In a vehicle-wheel, a metallic channel, a rubber tire seated therein, V-shaped retaining-bands extending through the base of said rubber tire with the narrowest portions of said bands substantially flush with the bottom of said tire, an independent fabric covering for each of said bands, a fabric covering for the base of said rubber tire extending between said bands and the base of the channel adapted to bind said retaining-bands in position in said rubber tire, and an expansible base for said channel with means for expanding the same to press said base firmly against the fabric on said tire, substantially as and for the purpose specified.

In testimony whereof I have hereunto set my hand this 26th day of February, A. D. 1904.

ALVARO S. KROTZ.

Witnesses:
CHAS. I. WELCH,
CLIFTON P. GRANT.